United States Patent [19]

Steiger et al.

[11] 3,901,032

[45] Aug. 29, 1975

[54] REVERSIBLE HYDROSTATIC TRANSMISSION

[75] Inventors: Anton Steiger, Illnau; Peter Rutz, Winterthur, both of Switzerland

[73] Assignee: Sulzer Brothers Limited, Winterthur, Switzerland

[22] Filed: May 1, 1974

[21] Appl. No.: 465,743

[30] Foreign Application Priority Data
May 17, 1973 Switzerland.......................... 7032/73

[52] U.S. Cl. ...................... 60/460; 60/465; 60/466; 60/493; 60/494
[51] Int. Cl.² ..................... F16H 39/46; F15B 15/18
[58] Field of Search ............. 60/456, 460, 461, 465, 60/466, 493, 494

[56] References Cited
UNITED STATES PATENTS
| | | | |
|---|---|---|---|
| 1,972,462 | 9/1934 | Schafer | 60/460 |
| 2,285,069 | 6/1942 | Vickers | 60/461 X |
| 3,035,414 | 5/1962 | Smith | 60/456 X |
| 3,180,091 | 4/1965 | Bruno | 60/465 X |
| 3,369,360 | 2/1968 | De Biasi | 60/493 X |
| 3,785,157 | 1/1974 | Kittle | 60/494 X |

*Primary Examiner*—Edgar W. Geoghegan
*Attorney, Agent, or Firm*—Kenyon & Kenyon Reilly Carr & Chapin

[57] ABSTRACT

The transmission uses a pump which delivers in only one direction and the pump delivery line contains a reversing means such as a changeover valve for changing over the connections of the hydrostatic motor. A cooler and a filter can be used in the pump suction line due to the lower pressures obtained. The changeover valve is operated by an adjusting means via an adjustable lever.

7 Claims, 1 Drawing Figure

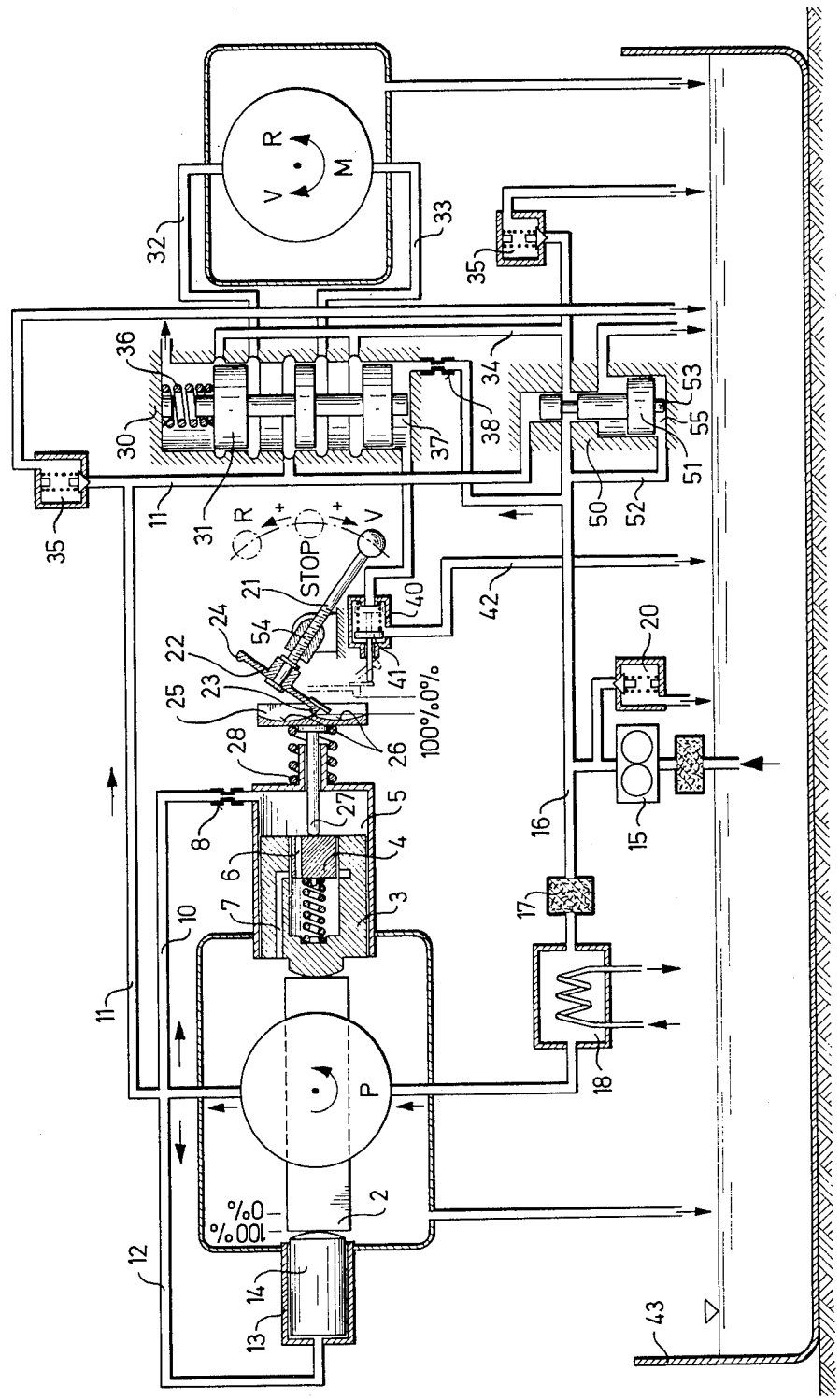

3,901,032

REVERSIBLE HYDROSTATIC TRANSMISSION

This invention relates to a reversible hydrostatic transmission.

Reversible hydrostatic transmissions have been known to have a pump connected to a hydrostatic motor. Generally, the pumps have been constructed to be adjustable in both directions from a zero point in order to permit reversing. This means that depending on the desired direction of rotation of the motor, the pump can deliver in one or the other direction while operating in the same sense of rotation. However, this construction suffers from several disadvantages. For example, it is necessary to use a complex adjusting device in which the adjusting stroke length is doubled. This also affects the installation volume of the pump. Further, since the pump suction and delivery lines must be interchanged, it is necessary for both to be constructed for the maximum delivery head. This makes the installation of filters or coolers difficult.

Accordingly, it is an object of the invention to provide a reversible hydrostatic transmission which does not require reversing of a pump in order to deliver a hydrostatic medium to a reversible motor.

It is another object of the invention to provide a pump of relatively small installation bulk for use in a hydrostatic transmission.

It is another object of the invention to reduce the size of a suction line of a pump used to deliver hydrostatic medium to a motor in a reversible transmission.

It is another object of the invention to use filters and coolers in the suction line of a pump used to deliver hydrostatic medium to a motor in a reversible transmission.

Briefly, the invention provides a reversible transmission which utilizes a uni-directional pump, i.e. a pump which rotates in only one direction and which delivers in only one direction. The pump also has a variable delivery rate and a delivery line for a flow of hydrostatic medium. The transmission also includes a hydrostatic motor which is connected to the pump delivery line via connections which are used for selectively driving the motor in one of two opposite directions. A reversing means is also provided in the delivery line for reversing the connections relative to the delivery line in order to reverse the motor.

The transmission permits the use of a simple pump which delivers in only one direction and enables a cooler and a filter to be disposed in the pump suction line since it is not possible for a high pressure to be generated in that line. An additional advantage is that the same pump can be used for reversible and non-reversible transmissions.

The reversing means may be a changeover valve for alternately connecting one of the motor connections to the pump delivery line and the other to a discharge line. The changeover valve can be operated in dependence on the position of an adjusting means which defines the pump delivery rate. This leads to a device of simple construction which operates reliably.

It is possible to provide a restrictor means in the motor discharge line to prevent the pressure of the hydraulic pressure medium in the motor and in the pump from dropping below a predefined limiting value. In pumps with a hydrostatic bearing system, this ensures reliable functioning of the pump even under no-load conditions. This is because there are forces, such as centrifugal force and acceleration forces, which are fully effective even when the pump operates under no-load conditions although there would be no pressure to form an oil cushion.

Advantageously, the restrictor means can be constructed as a valve, the spool of which is biased on the one hand by the pump delivery head and on the other hand by a controlled delivery head of a feeder pump used to supply the hydrostatic medium to the main pump. The ratio of the valve spool surfaces on which the pressures act is selected in accordance with the desired pressure ratio which is to be maintained.

The restrictor means can also be used to decelerate the hydraulic motor. In this regard, it has been found that the restrictor means can be utilized for decelerating the motor by decelerating the discharge of hydraulic medium from the hydrostatic motor. The motor thus operates as a pump which delivers against the restrictor means.

These and other objects and advantages of the invention will become more apparent from the following detailed description and appended claims taken in conjunction with the accompanying drawing in which:

The FIGURE illustrates a schematic diagram of a transmission according to the invention.

Referring to the drawing, the transmission comprises a hydrostatic pump P with a variable delivery rate driven by a motor (not shown), for example an electric motor. The pump P serves to drive a hydrostatic motor M by means of a hydrostatic pressure medium. In operation, the pump runs in a single direction of rotation as indicated by the arrow and as such is unidirectional. The desired delivery rate of the pump P is obtained by adjustment of an adjusting means 2 between the values of 100% and 0%. The adjusting means 2 can act, for example, on a trunnion of adjustable eccentricity about which an annular cylinder casing of a hydrostatic piston pump is rotatable. A follow-up control system is also provided for adjustment of the adjustment means 2. This follow-up control system has a piston 3 in which a spool 4 is guided in known manner to control the discharge of hydraulic pressure medium from a cylinder chamber 5 through ducts 6, 7 to define the position of the piston 3 and therefore of the adjusting means 2. The cylinder chamber 5 is connected via a restrictor 8 and a line 10 to a delivery line 11 of the pump P. A cylinder 13 with a coacting piston 14 which acts on the adjusting means 2 from the other side but with a smaller force is also connected via a line 12 to the delivery line 11.

The pump P is supplied with hydraulic pressure medium by a feeder pump 15 which delivers into a feeder or suction line 16. This suction line 16 which is connected to the pump P contains a filter 17 and a cooler 18 for the pressure medium. The delivery head of the feeder pump 15 is limited by a bypass valve 20.

An adjusting means for establishing the delivery rate of the pump P includes an adjusting lever 21 which is pivotable about a trunnion into one of a plurality of positions and is provided with a part 22 having two ends 23, 24. The ends 23, 24 co-operate with a disc 25 which is provided to define the position of the piston 3 of the follow-up control system and therefore to define the pump delivery rate. The disc 25, which has two cam surfaces 26, is mounted on a rod 27 which extends into the cylinder chamber 5 and bears against the spool 4 of the follow-up control system. The disc 25 is pressed by a spring 28 against one of the ends 23, 24.

A reversing means such as a changeover valve 30 with a valve spool 31 is connected to the delivery line 11 of the pump P. The changeover valve 30 permits optional, i.e. selective connection of the delivery line 11 to one of two connections, i.e. lines 32 and 33 of the motor M. The motor M will rotate in one or other direction of rotation, as indicated by the arrows V and R, depending on which of the connections 32 and 33 is connected to the line 11. The other of the connections 32, 33 is connected by the changeover valve 30 to a discharge duct 34 which extends into the feeder line 16 of the pump P.

As shown, the delivery line 11 and the discharge line 34 are provided with bypass valves 35 to limit the pressure. These valves 35 communicate via discharge lines with a vessel 43 containing a reservoir of pressure medium.

The valve spool 31 is biased by a spring 36 which presses the spool 31 into the bottom position when in an inoperative state. The bottom cylinder chamber 37 of the valve 30 is connected via a restrictor 38 to the feeder line 16.

The cylinder chamber 37 is also connected to an adjustable restrictor 40 which can be operated by the part 22 of the lever 21. This restrictor 40 is constructed to offer a greater resistance than the restrictor 38. If the lever 21 is moved from the middle position, marked STOP, into the position R, a piston-like part 41 of restrictor 40 will be moved to the right in the FIGURE, as indicated by chain lines, to restrict the discharge of hydraulic pressure medium from the cylinder chamber 37 into the vessel 43 through a discharge line 42. Since the resistance offered by the restrictor 40 is greater than that of the restrictor 38, the pressure in the cylinder chamber 37 rises and the valve spool 31 is moved into a top position. The connections of the lines 32 and 33 are therefore reversed so that the motor M rotates in the other direction. The adjusting means 21 – 24 thus not only establishes the delivery rate of the pump P but also operates the valve 30 in dependence on the position of the adjusting means.

The discharge line 34 also incorporates a restrictor means which takes the form of a valve 50 with a valve spool 51. The valve spool 51 controls the flow from the discharge line 34 into the feeder line 16 and is therefore able to influence the pressure in the motor M, in the delivery line 11 and in the pump P. To this end, one end of the spool 51 is connected to the delivery line 11 to be in communication with the flow of medium therein and the other end is connected via a line 52 to the feeder line 16 to be in communication with the flow of medium from the feeder pump 15. Since the pressure in the feeder line 16 is lower, that end faces of the spool 51 which is exposed to the pressure of the feeder line 16 is larger than the end face exposed to the pump delivery head.

In normal operation, when the pump P operates with high delivery heads, the valve spool 51 will be in a bottom position which is defined by a stop 53. Flow from the line 34 into the line 16 will be unobstructed. As soon as the pressure in the line 11 drops below a predefined limiting value, the valve spool 51 is moved upwardly, since the pressure in the chamber 55 is constant, and controls the discharge from the line 34 so that the predefined minimum pressure in the line 11 is maintained.

The pressure which is to be maintained and is necessary to ensure correct functioning of the hydrostatic bearing of the pump P depends on the construction of the pump P. As a rule, the pressure will be on the order of approximately 10% of the maximum delivery head of the pump P.

The cam surfaces 26 of the discs 25 are provided to linearize the ratio between the angular position of the lever 21 and the speed of rotation of the motor M. The drawing also shows that the part 22 is adjustable on screw-threading 54 of the lever 21. This enables the minimum delivery rate of the pump P under no-load conditions, i.e. when the motor M is stationary, to be adjusted to just cover the leakage losses of the pump P and of the motor M. In this way, it is possible to ensure that the shaft of the motor M cannot move even under load when the lever 21 is in the stop position.

It has been found that the restrictor means 50 also facilitates deceleration by means of the motor M. If the torque of the motor M is reversed (irrespective of the direction of rotation), the motor M will operate as a pump and will tend to empty the line 11. The pressure in this line 11 will therefore diminish. This is detected by the valve 50. The spool 51 then restricts the discharge from the motor M, which has become a pump, until the resultant pressure difference between the inlet and outlet of the motor M is sufficient to maintain the braking torque. The reversal from transmission to deceleration is therefore completely automatic while the motor speed remains constant provided the lever 21 has remained unchanged in its position.

What is claimed is:

1. A reversible hydrostatic transmission comprising
a uni-directional pump having a variable delivery rate and a delivery line;
a feeder pump for supplying a flow of hydrostatic medium to said uni-directional pump;
a hydrostatic motor connected to said delivery line, said motor having connections for selectively driving said motor in one of two opposite directions;
a discharge line connected to one of said connections of said motor to discharge a flow of medium therefrom; and
a restrictor means in said discharge line for preventing the pressure of the medium in said delivery line from falling below a preset limiting value, said restrictor means including a valve having a spool therein, said spool having one end face in communication with the flow of medium from said feeder pump and a second end face in communication with the flow of medium in said delivery line to maintain a preset pressure ratio between said flows; and
a reversing means in said delivery line for reversing said connections to reverse said motor.

2. A reversible hydrostatic transmission as set forth in claim 1 wherein said reversing means includes a changeover valve between said delivery line and said connections for alternately connecting said delivery line to one of said connections, and which further comprises a discharge line connected to said valve for alternating connection to another of said connections.

3. A reversible hydrostatic transmission as set forth in claim 2 which further comprises an adjusting means for establishing the delivery rate of said pump, said adjusting means being movable in one of a plurality of positions and being connected to said valve for operating said valve in dependence on the position of said adjusting means.

4. A reversible hydrostatic transmission comprising
a uni-directional pump having a variable delivery ratio for pumping a flow of hydrostatic medium in only one direction thereof,
a feeder pump for supplying a flow of hydrostatic medium to said uni-directional pump,
a delivery line connected to said pump to convey a flow of hydrostatic medium therefrom,
a hydrostatic motor having a pair of connections selectively communicating with said delivery line to receive the flow of hydrostatic medium and to deliver the flow to said motor to drive said motor in one of two opposite directions,
a discharge line connected to one of said connections of said motor to discharge a flow of medium therefrom,
a restrictor means in said discharge line for preventing the pressure of the medium in said delivery line from falling below a preset limiting value, said restrictor means including a valve having a spool therein, said spool having one end face in communication with the flow of medium from said feeder pump and a second end face in communication with the flow of medium in said delivery line to maintain a preset pressure ratio between said flows, and
a reversing means in said delivery line for reversing said connections relative to said delivery line to deliver the flow of hydrostatic medium to said motor to drive said motor in the other of said directions.

5. A reversible hydrostatic transmission as set forth in claim 4 wherein said reversing means is a changeover valve for alternately connecting said delivery line to one of said connections to deliver the flow of medium to said motor and the other of said connections to a discharge line to discharge a flow of medium from said motor.

6. A reversible hydrostaitc transmission as set forth in claim 4 further comprising an adjusting means for establishing the delivery rate of said pump, said adjusting means being movable into one of a plurality of positions and being connected to said reversing means to operate said reversing means in dependence on the position of said adjusting means to connect said connecting line from one connection to the other connection.

7. A reversible hydrostatic transmission as set forth in claim 4 further comprising a suction line connected to said pump for delivering hydrostatic medium thereto, a filter in said suction line for filtering the flow and a cooler in said suction line for cooling the flow.

* * * * *